(12) United States Patent
Guggenheim et al.

(10) Patent No.: US 7,125,954 B2
(45) Date of Patent: Oct. 24, 2006

(54) METHOD FOR PRODUCING POLYETHER POLYMERS

(75) Inventors: Thomas Link Guggenheim, Mt. Vernon, IN (US); Norman Enoch Johnson, Mt. Vernon, IN (US); Ganesh Kailasam, Evansville, IN (US); Pradeep Nadkarni, Bangalore (IN); David Winfield Woodruff, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/044,942

(22) Filed: Jan. 27, 2005

(65) Prior Publication Data

US 2006/0167210 A1    Jul. 27, 2006

(51) Int. Cl.
*C08F 6/00* (2006.01)

(52) U.S. Cl. ............ 528/491; 502/150; 528/125; 528/126; 528/196

(58) Field of Classification Search ........... 502/150; 528/125, 126, 196, 491
See application file for complete search history.

(56) References Cited

U.S. PATENT DOCUMENTS

| 3,787,364 A | | 1/1974 | Wirth et al. | |
|---|---|---|---|---|
| 3,838,097 A | | 9/1974 | Wirth et al. | |
| 3,847,869 A | | 11/1974 | Williams, III | |
| 3,852,242 A | | 12/1974 | White | |
| 4,931,284 A | * | 6/1990 | Ekman et al. | 424/450 |
| 5,001,062 A | * | 3/1991 | Larsson et al. | 435/176 |
| 5,084,267 A | * | 1/1992 | Damani | 424/426 |
| 5,143,934 A | * | 9/1992 | Lading et al. | 514/396 |
| 5,151,272 A | * | 9/1992 | Engstrom et al. | 424/450 |
| 5,196,201 A | | 3/1993 | Larsson et al. | |
| 5,229,482 A | | 7/1993 | Brunelle | |
| 5,262,164 A | | 11/1993 | Damani | |
| 5,371,109 A | | 12/1994 | Engstrom et al. | |
| 5,514,813 A | | 5/1996 | Brunelle | |
| 5,531,925 A | | 7/1996 | Landh et al. | |
| 5,637,625 A | | 6/1997 | Haynes | |
| 5,663,275 A | | 9/1997 | Schmidhauser | |
| 5,753,259 A | | 5/1998 | Engstrom et al. | |
| 5,830,974 A | | 11/1998 | Schmidhauser et al. | |
| 5,856,421 A | | 1/1999 | Schmidhauser | |
| 5,908,915 A | | 6/1999 | Brunelle | |
| 6,235,866 B1 | * | 5/2001 | Khouri et al. | 528/125 |
| 6,235,934 B1 | | 5/2001 | Caringi et al. | |
| 6,265,521 B1 | * | 7/2001 | Fyvie et al. | 528/170 |
| 2002/0151675 A1 | * | 10/2002 | Johnson et al. | 528/491 |
| 2002/0153508 A1 | | 10/2002 | Lynch | |
| 2002/0153509 A1 | | 10/2002 | Lynch | |
| 2002/0158226 A1 | | 10/2002 | Lynch | |
| 2002/0160040 A1 | | 10/2002 | Spicer | |

FOREIGN PATENT DOCUMENTS

| WO | WO93/06921 | 4/1993 |
|---|---|---|
| WO | WO99/15171 | 9/1998 |

* cited by examiner

*Primary Examiner*—Terressa Boykin

(57) ABSTRACT

A method of making a polyether polymer comprises reacting a salt of a dihydroxy-substituted aromatic hydrocarbon with a substituted aromatic compound of formula (I)

$$Z(A^1-X^1)_2 \qquad (I)$$

in the presence of a catalyst to form an intermediate polymer having endgroups, wherein the molar ratio of the salt of a dihydroxy-substituted aromatic hydrocarbon to the substituted aromatic compound is less than 1, Z is an activating radical, $A^1$ is an aromatic radical and $X^1$ is fluoro, chloro, bromo or nitro; determining the additional amount of the salt of a dihydroxy-substituted aromatic hydrocarbon needed to form a final polyether polymer with a predetermined molecular weight and adding the additional amount of the salt of a dihydroxy-substituted aromatic hydrocarbon to the intermediate polymer.

23 Claims, 1 Drawing Sheet

METHOD FOR PRODUCING POLYETHER POLYMERS

BACKGROUND OF THE INVENTION

Various types of aromatic polyethers, including polyetherimides, polyethersulfones, polyetheretherketones, and polyetherketones, have become important as engineering resins by reason of their excellent properties. These polymers are generally prepared by the reaction of salts of dihydroxyaromatic hydrocarbons, such as bisphenol A disodium salt, with dihaloaromatic molecules such as bis(4-fluorophenyl)sulfone, bis(4-chlorophenyl)sulfone, the analogous ketones and bis(halophenyl)bisimides or bis(nitrophenyl)bisimides as illustrated by 1,3-bis[N-(4-chlorophthalimido)]benzene. Substantially equimolar proportions of the two reagents are normally required, with adjustments if desired for the presence of endcapping reagents such as 1-[N-(4-chlorophthalimido)]-3-(N-phthalimido)benzene.

One difficulty in the preparation of polyether polymers by these methods is the preparation of polymers of controlled and desired molecular weights. Since very nearly equimolar proportions of the principal reagents are used, it is generally very difficult to predict or control the molecular weight of the polyether polymer. For example, polyetherimides having a weight average molecular in a particular range may be desired by reason of their advantageous properties, but a given reaction may afford a product whose molecular weight is much higher or, more often, much lower. That product, being off specification, must be discarded, increasing the cost and size of the waste stream, with adverse consequences to the environment.

One approach to control the polymer molecular weight has been to employ a less than equimolar amount of the dihydroxy-substituted aromatic hydrocarbon to form an intermediate polymer having a low molecular weight and then adding a second portion of dihydroxy-substituted aromatic hydrocarbon sufficient to result in a polymer having the desired molecular weight. The amount of dihydroxy-substituted aromatic hydrocarbon in the second portion can be difficult to determine accurately and consistently.

Accordingly there is a need in the art for an improved method of controlling the molecular weight of a polymer over a range of molecular weights.

SUMMARY OF THE INVENTION

A method of making a polyether polymer comprises reacting a salt of a dihydroxy-substituted aromatic hydrocarbon with a substituted aromatic compound of formula (I)

$$Z(A^1-X^1)_2 \qquad (I)$$

in the presence of a catalyst to form an intermediate polymer, wherein the molar ratio of the salt of a dihydroxy-substituted aromatic hydrocarbon to the substituted aromatic compound is less than 1, Z is an activating radical, $A^1$ is an aromatic radical and $X^1$ comprises fluoro, chloro, bromo nitro, or a combination of two or more of the foregoing; determining an additional amount of a salt of a dihydroxy-substituted aromatic hydrocarbon needed to form a final polyether polymer with a predetermined molecular weight and adding the additional amount of a salt of a dihydroxy-substituted aromatic hydrocarbon to the intermediate polymer.

BRIEF DESCRIPTION OF THE DRAWINGS

The FIGURE is a graph relating polymer molecular weight to the amount of bisphenol A added per 1000 pounds of polymer.

DETAILED DESCRIPTION

Figure 1:
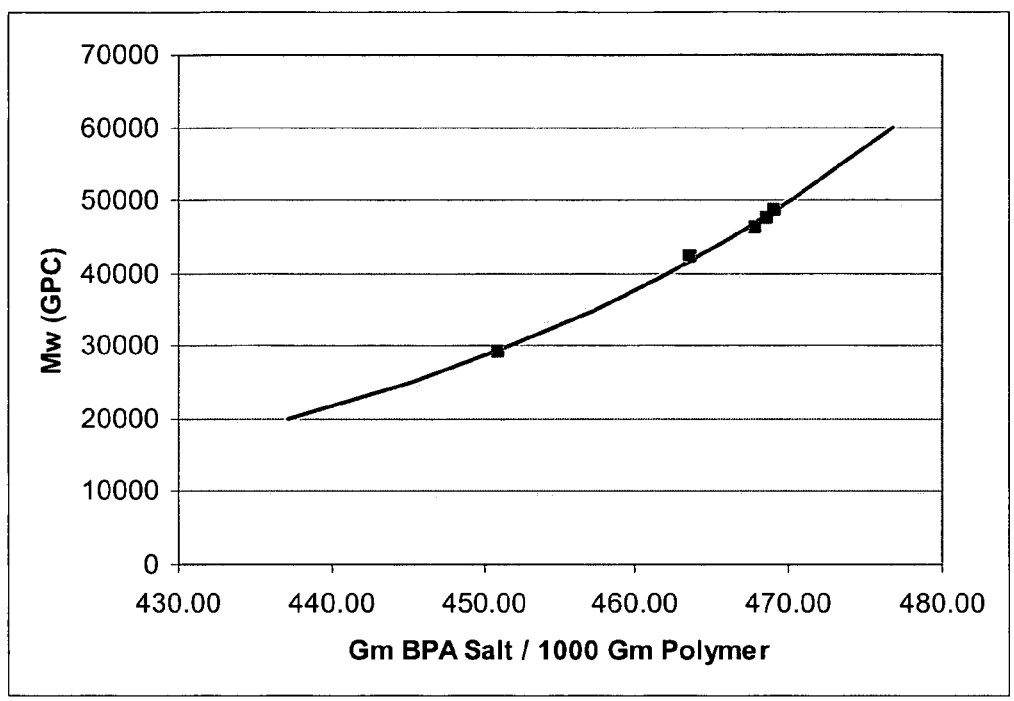

A method of making a polyether polymer comprises reacting a salt of a dihydroxy substituted aromatic hydrocarbon with a substituted aromatic compound of the formula $$Z(A^1-X^1)_2 \qquad (I)$$

wherein Z is an activating radical, $A^1$ is an aromatic radical and $X^1$ comprises fluoro, chloro, bromo, nitro, or a combination of two or more of the foregoing. The reaction occurs in the presence of a catalyst and forms an intermediate polymer. The molar ratio of the salt of a dihydroxy-substituted aromatic hydrocarbon to the substituted aromatic compound is less than 1.

Molecular weights described and disclosed herein are expressed in atomic mass units (amu).

In one embodiment, the number of endgroups present in the intermediate polymer and the final polyether polymer are determined and the amount of additional dihydroxy-substituted aromatic hydrocarbon salt is calculated based on the number of endgroups on the intermediate and final polymer and the number average molecular weight (Mn) of the final polymer. The intermediate polymer is reacted with the additional amount of the salt of the dihydroxy-substituted aromatic hydrocarbon to form the final polymer having a predetermined molecular weight.

In another embodiment, the molecular weight of the intermediate polymer is measured and the amount of the dihydroxy-substituted aromatic hydrocarbon salt added to form the intermediate polymer is determined by comparing the molecular weight of the intermediate polymer to an empirical relationship between the molecular weight of a polyether polymer and the amount of dihydroxy-substituted aromatic hydrocarbon salt per amount of polymer. Empirical is herein defined as originating in or based on observation or experience. The empirical relationship relating the amount of the dihydroxy-substituted aromatic hydrocarbon salt per amount of polymer to molecular weight can be in the form of a graph, plot or mathematical expression. The amount of additional dihydroxy-substituted aromatic hydrocarbon salt equals (the amount of dihydroxy-substituted aromatic hydrocarbon salt per amount of final polymer- the amount of dihydroxy-substituted aromatic hydrocarbon salt per amount of intermediate polymer) X the amount of final polymer.

Either of the above embodiments may be used to produce a polyether with a desired molecular weight and a consistent polydispersity thus decreasing variation of physical properties due to variations in molecular weight. Polydispersity is defined as weight average molecular weight (Mw)/number average molecular weight (Mn). Additionally, high temperature stability can be controlled by managing the end group profile. High amounts of endgroups such as phthalic acid and chloro can give the polyether polymer excellent high temperature stability. Other end groups may be present due to side reactions, catalyst degradation and the like. In some embodiments it is desirable for the chloro end group content to be less than 2,000 parts per million by weight (ppm).

Dihydroxy-substituted aromatic hydrocarbons include those having the formula $$HO-A^2-OH \qquad (II)$$

wherein $A^2$ is a divalent aromatic hydrocarbon radical. Suitable $A^2$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons.

In one embodiment, the $A^2$ radical has the formula

(III)

wherein each of $A^3$ and $A^4$ may be a monocyclic divalent aromatic hydrocarbon radical and Y may be a bridging hydrocarbon radical in which one or two atoms separate $A^3$ from $A^4$. The free valence bonds in formula III are usually in the meta or para positions of $A^3$ and $A^4$ in relation to Y. Compounds in which $A^2$ has formula III are bisphenols, and for the sake of brevity, the term "bisphenol" is sometimes used herein to designate the dihydroxy-substituted aromatic hydrocarbons; it should be understood, however, that non-bisphenol compounds of this type may also be employed.

In formula III, the $A^3$ and $A^4$ values may be unsubstituted phenylene or halo or hydrocarbon-substituted derivatives thereof, illustrative substituents (one or more) being alkyl, alkenyl, bromo, chloro. Unsubstituted phenylene radicals may be advantagous. Both $A^3$ and $A^4$ may be p-phenylene, although both may be o- or m-phenylene or one o- or m-phenylene and the other p-phenylene.

The bridging radical, Y, may be one in which one or two atoms separate $A^3$ from $A^4$. Illustrative radicals of this type are methylene, cyclohexylmethylene, 2-[2.2.1]-bicycloheptylmethylene, ethylene, isopropylidene, neopentylidene, cyclohexylidene, cyclopentadecylidene, cyclododecylidene, adamantylidene and gem-alkylene (alkylidene) radicals. Unsaturated radicals are, however, also included.

Also included among suitable dihydroxy-substituted aromatic hydrocarbons are the 1,1'-spirobi[indane]-6,6'-diols having formula IV:

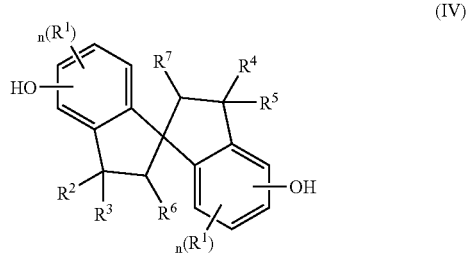
(IV)

wherein each $R^1$ is independently a monovalent hydrocarbon radical or a halogen radical; each $R^2$, $R^3$, $R^4$, and $R^5$ is independently a $C_{1-6}$ alkyl; each $R^6$ and $R^7$ is independently a hydrogen or $C_{1-6}$ alkyl; and each n is independently selected from positive integers having a value of 0 to 3 inclusive. In one embodiment the 1,1'-spirobi[indane]-6,6'-diol is 3,3,3',3'-tetramethyl-1,1'-spirobi[indane]-6,6'-diol.

Some examples of dihydroxy-substituted aromatic hydrocarbons of formula II include 6-hydroxy-1-(4'-hydroxyphenyl)-1,3,3-trimethylindane; 4,4'-(3,3,5-trimethylcyclo-hexylidene)diphenol; 1,1-bis(4-hydroxy-3-methylphenyl)cyclohexane; 2,2-bis(4-hydroxyphenyl)propane (commonly known as bisphenol-A); 2,2-bis(4-hydroxy-3,5-dimethylphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,4'-dihyroxydiphenylmethane; bis(2-hydroxyphenyl)methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; resorcinol; and $C_{1-3}$ alkyl-substituted resorcinols. In one embodiment the dihydoxy substituted aromatic hydrocarbon is bisphenol A in which the radical of formula II is the 2,2-bis(4-phenylene)propane radical and in which Y is isopropylidene and $A^3$ and $A^4$ are each p-phenylene.

The alkali metal salts of dihydroxy-substituted aromatic hydrocarbons are generally sodium or potassium salts although other salts may be used. Sodium salts are frequently desirable by reason of their availability and relatively low cost.

The substituted aromatic compounds comprise at least one compound of formula I, and contain an aromatic radical $A^1$ and an activating radical Z. The $A^1$ radical is normally a di- or polyvalent $C_{6-10}$ radical. The $A^1$ radical may be monocyclic and free from electron-withdrawing substituents other than Z. In one embodiment the $A^1$ radical is an unsubstituted $C_6$ aromatic radical.

The radical Z is one that activates a leaving group $X^1$ on an aromatic radical for displacement by alkali metal salts of dihydroxy-substituted aromatic hydrocarbons. The Z radical is usually an electron-withdrawing group, which may be di- or polyvalent to correspond with the valence of $A^1$. Illustrative examples of divalent radicals include carbonyl, carbonyl bis(arylene), sulfone, bis(arylene)sulfone, benzo-1,2-diazine and azoxy. Illustrative examples of the moiety $—A^1—Z—A^1—$ include bis(arylene)sulfone, bis(arylene) ketone, tris(arylene)bis(sulfone), tris(arylene)bis(ketone), bis(arylene)benzo-1,2-diazine or bis(arylene)azoxy radical and especially those in which $A^1$ is p-phenylene.

Also included are compounds in which $—A^1—Z—A^1—$ is a bis(ether imide) radical, illustrated by those of the formula

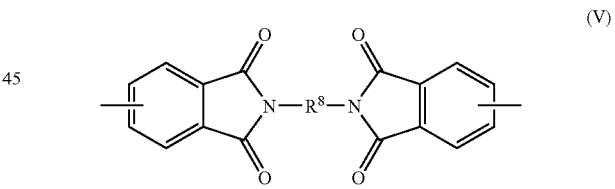
(V)

wherein $R^8$ is a substituted or unsubstituted $C_{6-20}$ divalent aromatic hydrocarbon radical, or a $C_{2-22}$ alkylene or cycloalkylene radical.

In one embodiment $R^8$ is derived from a diamine selected from the group consisting of aliphatic, aromatic, and heterocyclic diamines. Exemplary aliphatic moieties include, but are not limited to, straight chain-, branched-, and cycloalkyl radicals, and their substituted derivatives. Straight-chain and branched alkyl radicals are generally those containing from 2 to 22 carbon atoms, and include as illustrative non-limiting examples ethyl, propyl, butyl, neopentyl, hexyl, dodecyl. Cycloalkyl radicals are generally those containing from 3 to 12 ring carbon atoms. Some illustrative non-limiting examples of cycloalkyl radicals include cyclobutyl, cyclopentyl, cyclohexyl, methylcyclohexyl, and cycloheptyl.

The two amino groups in diamine-derived aliphatic moieties may be separated from each other by at least two and in some cases by at least three carbon atoms. In an exemplary embodiment for diamines, the two amino groups are in the alpha, omega positions of a straight-chain or branched alkyl radical, or their substituted derivatives; or in the 1,4-positions of a cycloalkyl radical or its substituted derivatives. Exemplary substituents for the said aliphatic moieties include one or more halogen groups, such as fluoro, chloro, or bromo, or mixtures thereof; or one or more aryl groups, such as phenyl groups, alkyl- or halogen-substituted phenyl groups, or mixtures thereof.

Aromatic moieties suitable for $R^8$ in formula V include, but are not limited to, monocyclic, polycyclic and fused aromatic compounds having 6 to 20, or, more specifically, 6 to 18 ring carbon atoms, and their substituted derivatives. Polycyclic aromatic moieties may be directly linked (such as, for example, biphenyl) or may be separated by 1 or 2 atoms comprising linking moieties as in formula VI

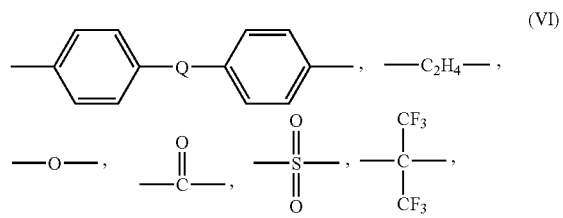

(VI)

or a covalent bond. Representative linking moieties may also include phosphoryl, S, and $C_{1-6}$ aliphatic, such as isopropylidene and methylene. Illustrative non-limiting examples of aromatic moieties include phenyl, biphenyl, naphthyl, bis(phenyl)methane, bis(phenyl)-2,2-propane, and their substituted derivatives. Exemplary substituents include one or more halogen groups, such as fluoro, chloro, or bromo, or mixtures thereof; or one or more straight-, chain-, branched-, or cycloalkyl groups having from 1 to 22 carbon atoms, for example, methyl, ethyl, propyl, isopropyl, tert-butyl, or mixtures thereof.

The two amino groups in diamine-derived aromatic moieties may be separated by at least two carbon atoms. When the amino group or groups are located in different aromatic rings of a polycyclic aromatic moiety, they may be separated from the direct linkage or from the linking moiety between any two aromatic rings by at least two ring carbon atoms. Exemplary diamines include meta-phenylenediamine; para-phenylenediamine; mixtures of meta- and para-phenylenediamine; isomeric 2-methyl- and 5-methyl-4,6-diethyl-1,3-phenylenediamines or their mixtures; bis(4-diaminophenyl)-2,2-propane; and bis(2-chloro-4-amino-3,5-diethylphenyl)methane.

Heterocyclic moieties suitable for $R^8$ in formula V include, but are not limited to, monocyclic, polycyclic and fused heterocyclic compounds having 3 to 30, or, more specifically, 5 to 13 ring carbon atoms, and 1 to 4 ring heteroatoms. Exemplary ring heteroatoms include, but are not limited to, oxygen, nitrogen, sulfur, or combinations thereof. Polycyclic heterocyclic moieties may be directly linked (such as, for example, bipyridyl) or may be separated by 1 or 2 atoms comprising linking moieties. Representative linking moieties include, but are not limited to, carbonyl, phosphoryl, O, S, $SO_2$, $C_{1-6}$ aliphatic, such as isopropylidene and methylene.

The two amino groups in diamine-derived heterocyclic moieties may be separated by at least two ring atoms. When the amino group or groups are located in different heterocyclic rings of a polycyclic heterocyclic moiety, they may be separated from the direct linkage or from the linking moiety between any two heterocyclic rings by at least two ring atoms. Exemplary heterocyclic moieties include, but are not limited to, furyl, pyridyl, bipyridyl, pyrryl, pyrazinyl, pyrimidyl, pyrazolyl, thiazyl, thienyl, bithienyl, and quinolyl.

Most often, $R^8$ is at least one of m-phenylene, p-phenylene, 4,4'-oxybis(phenylene) or silicon containing monomers. Polyvalent Z radicals include those in which Z together with $A^1$ forms part of a fused ring system such as benzimidazole, benzoxazole, quinoxaline or benzofuran.

Also present in the substituted aromatic compound of formulas I are two displaceable $X^1$ radicals which may be selected from fluoro, chloro, bromo, nitro and combinations of two or more of the foregoing. In one embodiment $X^1$ comprises fluoro and/or chloro atoms.

Exemplary substituted aromatic compounds of formula I are bis(4-fluorophenyl)sulfone and the corresponding chloro compound, bis(4-fluorophenyl) ketone and the corresponding chloro compound, and 1,3- and 1,4-bis[N-(4-fluorophthalimido)]benzene and 1,3- and 1,4-bis[N-(3-fluorophthalimido)]-benzene; and 4,4'-bis[N-(4-fluorophthalimido)]phenyl ether and 4,4'-bis[N-(3-fluorophthalimido)]phenyl ether; and the corresponding chloro, bromo and nitro compounds. In some embodiments the bis(phthalimido) compounds are the most preferred. Mixtures of such compounds may also be employed. Exemplary bis(phthalimido) compounds of formula I include at least one of, and/or combinations of 1,3-bis[N-(4-chlorophthalimido)]benzene, 1,4-bis[N-(4-chlorophthalimido)]benzene, 1,3-bis[N-(3-chlorophthalimido)]benzene, 1,4-bis[N-(3-chlorophthalimido)]benzene, 1-[N-(4-chlorophthalimido)]-3-[N-(3-chlorophthalimido)benzene, and 1-[N-(4-chlorophthalimido)]-4-[N-(3-chlorophthalimido)benzene.

The polymerization reaction is conducted in at least one solvent. The solvent may have a boiling point of greater than or equal to about 150 degrees Celsius, in order to facilitate the reaction which requires temperatures greater than or equal to about 125 and less than or equal to about 250 degrees Celsius. Additionally, the reaction is generally sensitive to water and in some embodiments the solvent-comprising reaction mixture is dried by known methods, for example by boiling or azeotroping water from the mixture, generally prior to delivering the catalyst. The water removal from the system may be accomplished in either batch, semi-continuous or continuous processes using various means such as a distillation column in conjunction with one or more reactors. In an exemplary embodiment, a mixture of water and non-polar organic liquid distilling from a reactor is sent to a distillation column where water is taken off overhead and solvent is recycled back into the reactor at a rate to maintain or increase the desired solids concentration. Other methods for water removal include, but are not limited to, passing the condensed distillate through a drying bed for chemical or physical adsorption of water.

In an exemplary embodiment bisphenol A disodium salt is added to the organic solvent and the mixture azeotroped to a dry condition. Then a bis[N-(chlorophthalimido)]benzene may be added and the mixture azeotroped to a dry condition. Then a catalyst may be added as a pre-dried solution in organic solvent. The process is expedited when predried solvent and co-monomers are used. Alternatively, the bis[N-(chlorophthalimido)]benzene in an organic solvent is dried and dry catalyst in an organic solvent is added to the bis[N-(chlorophthalimido)]benzene solution, followed by the addition of dry bisphenol A disodium salt.

In one embodiment the reaction mixture is essentially dry. Essentially dry as used herein means a mixture that contains less than or equal to about 100 parts per million (ppm) water, or, more specifically, less than or equal to about 50 ppm water, or, even more specifically less than or equal to about 25 ppm water, or, even more specifically, less than or equal to about 10 ppm water as measured by Karl Fisher titration. A sufficiently dry state means that a reaction mixture is essentially dry.

An exemplary class of solvents includes those of low polarity. Suitable solvents of this type include halogenated aromatic compounds such as o-dichlorobenzene, dichlorotoluene and 1,2,4-trichlorobenzene; and diphenyl sulfone. Solvents of similar polarity but lower boiling points, such as chlorobenzene, may be employed at super atmospheric pressures. Another class of solvents includes aromatic ethers such as diphenyl ether, phenetole (ethoxybenzene), veratrole (1,2-dimethoxybenzne) and anisole (methoxybenzene). In one embodiment the solvent comprises one or more alkoxybenzenes, such as anisole. In some cases the halogenated aromatic solvents may be more desirable than alkoxybenzenes since the former can have less tendency than the latter to interact with and inactivate the phase transfer catalyst described below. Another class of useful solvents is polar aprotic solvents, illustrative examples of which include dimethylformamide (DMF), dimethylacetamide (DMAc), dimethylsulfoxide (DMSO), and N-methylpyrrolidinone (NMP).

The catalyst comprises a phase transfer catalyst which is substantially stable at temperatures greater than or equal to about 125 degrees Celsius and less than or equal to about 250 degrees Celsius. Various types of phase transfer catalysts may be employed for this purpose. They include quaternary phosphonium salts, N-alkyl-4-dialkylaminopyridinium salts, and guanidinium salts.

In one embodiment the phase transfer catalyst may be chosen from hexaalkylguanidinium salts, alpha,omega-bis(pentaalkylguanidinium)alkane salts and combinations of two or more of the foregoing. For the sake of brevity, both types of salts are hereinafter sometimes designated as "guanidinium salt".

Suitable guanidinium salts are illustrated by those of the formula

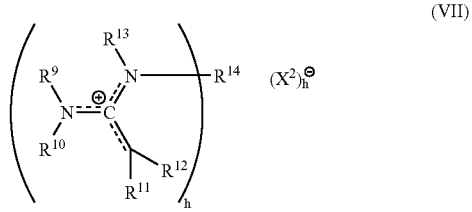

(VII)

wherein each $R^9$, $R^{10}$, $R^{11}$, $R^{12}$ and $R^{13}$ is a primary alkyl radical and $R^{14}$ is a primary alkyl or bis(primary alkylene) radical, or at least one of the $R^9$–$R^{10}$, $R^{11}$–$R^{12}$ and $R^{13}$–$R^{14}$ combinations with the connecting nitrogen atom forms a heterocyclic radical; $X^2$ is an anion; and h is 1 or 2.

The alkyl radicals suitable as $R^{9-13}$ include primary alkyl radicals, generally containing about 1–12 carbon atoms. $R^{14}$ may be an alkyl radical of the same structure as $R^{9-13}$ or a $C_{2-12}$ alkylene radical in which the terminal carbons are primary; for example, it is $C_{2-6}$ alkyl or $C_{4-8}$ straight chain alkylene. Alternatively, any combination of $R^{9-14}$ and the corresponding nitrogen atom(s) may form a heterocyclic radical such as piperidino, pyrrolo or morpholino.

The $X^2$ value may be any anion and in one embodiment $X^2$ comprises an anion of a strong acid, such as chloride, bromide, methanesulfonate or a combination of anions of strong acids. The value of h will be 1 or 2 depending on whether $R^{14}$ is alkyl or alkylene.

As indicated by the dotted bonds in formula VII, the positive charge in the guanidinium salt is delocalized over one carbon and three nitrogen atoms. This is believed to contribute to the salts' stability under relatively high temperature conditions.

In an exemplary embodiment, a salt of a dihydroxy-substituted aromatic hydrocarbon and a substituted aromatic hydrocarbon are combined in a solvent in the presence of a catalyst. The amount of the salt of a dihydroxy-substituted aromatic hydrocarbon used is less than equimolar. The reaction results in an intermediate low molecular weight polymer (i.e., a polymer having a molecular weight less than the desired molecular weigh of the final polymer). Exemplary molecular weights for the intermediate low molecular weight are a weight average molecular weight greater than or equal to about 10,000 and less than or equal to about 40,000, or, more specifically, greater than or equal to about 20,000 and less than or equal to about 40,000, or, even more specifically, greater than or equal to about 30,000 and less than or equal to about 40,000. It is also within the scope of the disclosure to employ monofunctional reagents such as monohydroxyaromatic compounds or monohalo- or nitroaromatic compounds as chain termination agents, as illustrated by the aforementioned 1-[N-(4-chlorophthalimido)]-3-(N-phthalimido)benzene in the case of a polyetherimide.

The amount of the bisphenol salt of the dihydroxy-substituted aromatic hydrocarbon initially introduced to form the intermediate polymer will vary according to the desired final molecular weight of the product. Most often, the amount is greater than or equal to about 92 and less than or equal to about 99.8 mole percent, or, more specifically, greater than or equal to about 95 and less than or equal to about 99.5 mole percent, or, even more specifically, greater than or equal to about 97 and less than or equal to about 99.5 mole percent of the stoichiometric amount is employed in this step.

In one embodiment, the gram moles of endgroups present on the intermediate and final polymer are determined. Once the number of end groups of the intermediate polymer and the final polymer are ascertained, the amount of bisphenol salt and/or the end capping agent to be added to achieve a polymer of desired molecular weight may be determined.

The gram moles of end groups of the intermediate and final polymer may be calculated using the following equation:

Gram moles of endgroups per gram of polymer=2× (1−weight fraction of cyclics)/absolute number average molecular weight.

The number average and weight average molecular weight as well as the weight fraction of cyclics may be measured by various methods, such as gel permeation chromatography (GPC) and triple detect instruments. GPC determines molecular weight relative to polystyrene standards and as such yields a relative molecular weight, not an absolute molecular weight. Triple detect instruments determine the absolute molecular weight (both number average (Mn) and weight average (Mw)) but are expensive and not common. Other methods that may also be employed are an online (in situ) method of molecular weight determination such as light scattering or indirect measurements such as intrinsic viscosity may be employed. When indirect measurement or GPC values are used, the data may be correlated to absolute molecular weight using a calibration curve.

In an exemplary embodiment, molecular weight of the intermediate polymer as well as the final product is determined using a triple detect instrument which comprises a GPC with a triple detector system (laser light scattering, viscosity, and refractive index).

Once the gram moles of end groups per gram of polymer for the intermediate polymer is determined and the gram moles of end groups per gram of polymer for the final polymer is determined, the amount or moles of the salt of dihydroxy-substituted aromatic hydrocarbon to be added to obtain the polymer of desired molecular weight may be determined by: grams of final polymer X (gram moles of end groups per gram of polymer for the intermediate polymer - gram moles of end groups per gram of polymer for the final polymer)/2.

Alternatively, the molecular weight of the intermediate polymer is measured and the amount of the salt of a dihydroxy-substituted aromatic hydrocarbon added to form the intermediate polymer is determined by comparing the molecular weight of the intermediate polymer to an empirical relationship between the molecular weight of a polyether polymer and the amount of a salt of a dihydroxy-substituted aromatic hydrocarbon per amount of polymer. The empirical relationship is generated from historical data based on the same combination of dihydroxy-substituted aromatic hydrocarbon salt, substituted aromatic compound and catalyst. The empirical relationship relating the amount of the salt of a dihydroxy-substituted aromatic hydrocarbon per amount of polymer made to molecular weight can be in the form of a graph, plot or mathematical expression. The amount of additional dihydroxy-substituted aromatic hydrocarbon salt equals: (the amount of dihydroxy-substituted aromatic hydrocarbon salt per amount of final polymer- the amount of dihydroxy-substituted aromatic hydrocarbon salt per amount of intermediate polymer) X the amount of final polymer. Because of inaccuracies in the feed weight and of the weight percent solids analytical method for the dihydroxy-substituted aromatic hydrocarbon salt, it is more advantageous to measure molecular weight after the initial charge of dihydroxy-substituted aromatic hydrocarbon salt and use the correlation to calculate the amount of salt that must have been added to achieve that molecular weight. The amount of dihydroxy-substituted aromatic hydrocarbon salt per amount of final polymer may also be taken from the correlation.

Regardless of the method employed to ascertain the amount of additional dihydroxy-substituted aromatic hydrocarbon salt, it may be advantageous to monitor the progress of the polymerization reaction to ensure that sampling for the molecular weight does not occur until the reaction has reached a plateau, typically when the limiting reagent(s) has been depleted or nearly depleted. In one embodiment the polymerization reaction can be monitored by the use of an in-situ (on-line) viscosity meter. Because viscosity is known to be directly related to molecular weight, it is believed that when the increases in viscosity, corrected for changes in temperature and weight percent solids, over 10 minutes becomes less than or equal to about 10%, or, more specifically, less than or equal to about 5%, or, even more less than or equal to about 2%, the reaction has reached a plateau.

Reaction temperatures are those effective to promote a polymer-producing condensation reaction. Exemplary temperatures are greater than or equal to about 125 degrees Celsius and less than or equal to about 250 degrees Celsius, or, more specifically, greater than or equal to about 130 degrees Celsius and less than or equal to about 225 degrees Celsius. The proportion of phase transfer catalyst employed may be greater than or equal to about 0.5 mole percent and less than or equal to about 10 mole percent, or, more specifically, greater than or equal to about 0.7% mole percent and less than or equal to about 5 mole percent based on total bisphenol salt.

Once the amount of the dihydroxy-substituted aromatic hydrocarbon salt to be added to the intermediate polymer has been determined, that further amount of dihydroxy-substituted aromatic hydrocarbon salt is added. A dihydroxy-substituted aromatic hydrocarbon salt added at this point may be the same as or different from the dihydroxy-substituted aromatic hydrocarbon salt initially added. The amount of dihydroxy-substituted aromatic hydrocarbon salt to be added to the intermediate polymer may be greater than or equal to about 0.2 and less than or equal to about 8.0 mole percent, or, more specifically, greater than or equal to about 0.5 and less than or equal to about 5.0 mole percent, or, even more specifically, greater than or equal to about 0.5 and less than or equal to about 3.0 mole percent of the total amount employed; its exact level will depend on the molecular weight of the intermediate polymer, and the desired molecular weight of the final polymer.

Additionally, in some cases, it may be advantageous to keep the reaction mixture essentially dry during polymerization, particularly when adding the dihydroxy-substituted aromatic hydrocarbon salt to the intermediate polymer. Generally the reaction is run under a dry inert gas, such as nitrogen or argon, for example as a blanket or sparge. In the event that the reaction becomes water contaminated, further azeotroping to a desired level of dryness may be useful after which the additional dihydroxy-substituted aromatic hydrocarbon salt may be added and another aliquot of catalyst may be added if so desired.

Temperatures and other conditions employed in the addition of the dihydroxy-substituted aromatic hydrocarbon to the intermediate polymer are generally the same as during the formation of the intermediate polymer. It is not usually necessary to introduce additional phase transfer catalyst, but, if a decreased reaction rate suggesting catalyst inactivation is noted, it may be desirable to do so, usually to a total catalyst level which is not greater than about 7 mole percent and in some embodiments less than or equal to about 2 mole percent based on the total dihydroxy-substituted aromatic hydrocarbon.

Following completion of the reaction, the aromatic polyether polymer may be isolated by conventional methods. This generally includes filtration of the resulting inorganic salt, washing and isolation by stripping the solvent in stages using flashes, extruders and/or wiped-film evaporators.

In one embodiment, the final polyether polymer has a weight average molecular weight of about 42,000 to about 49,000 as determined by GPC. Within this range the weight average molecular weight may be greater than or equal to about 43,000, or, more specifically, greater than or equal to about 44,000. Also within this range the weight average molecular weight may be less than or equal to about 48,000, or, more specifically, less than or equal to about 47,000. The final polyether polymer may have a polydispersity of about 1.8 to about 2.9, or, more specifically, about 1.9 to about 2.8 or, even more specifically, about 2.0 to about 2.7.

In another embodiment, the final polyether polymer has a weight average molecular weight of about 49,000 to about 60,000 as determined by GPC. Within this range the weight average molecular weight may be greater than or equal to about 50,000, or, more specifically, greater than or equal to about 51,000. Also within this range the weight average molecular weight may be less than or equal to about 59,000, or, more specifically, less than or equal to about 58,000. The final polyether polymer may have a polydispersity of about 1.8 to about 3.1, or, more specifically, about 1.9 to about 3.0 or, even more specifically, about 2.0 to about 2.9.

The disclosure is illustrated by the following non-limiting examples.

All patents cited herein are incorporated by reference.

EXAMPLE 1

Reactions were conducted to produce a polyetherimide polymer with a target relative Mw of 46,000, an expected polydispersity of 2.57, a target absolute Mn of 14,028, an expected weight percent cyclics of 2%, a target pound mole endgroups per pound polymer of $1.397 \times 10^{-4}$ and a total polymer weight of 226,800 grams.

99,337 grams of bisphenol A disodium salt and 166,922 grams of bis[N-chlorophthalimido)]benzene were reacted in the presence of hexaethylguanidinium chloride in ortho dichlorobenzene for 150 minutes at 180 degrees Celsius. The reaction yielded a first intermediate polymer having a relative Mw=26500, a polydispersity of 2.265, an absolute Mn of 8663, and $2.262 \times 10^{-4}$ pound mole endgroups per pound polymer. 9.812 grams moles of bisphenol A disodium salt were calculated to be needed and 6.56 grams moles of bisphenol A disodium salt were added to the first intermediate polymer to yield a second intermediate polymer. The second intermediate polymer had a relative Mw of 35,985 and a polydispersity of 2.416. By a similar calculation for the correction, based on the measured Mw of 35,985, 3.515 gram moles of bisphenol A salt were added (3.56 gram moles of bisphenol A salt were calculated to be needed) to the second intermediate polymer to result in a polyetherimide polymer having a Mw of 46,462.

EXAMPLE 2

Reactions were conducted to ultimately produce about 226,796 grams of a polyetherimide polymer with a target relative Mw of 48,000. About 102,058 grams of bisphenol A disodium salt (BPA) and 167,058 grams of bis[N-chlorophthalimido)]benzene were reacted in the presence of hexaethylguanidinium chloride in ortho dichlorobenzene for 150 minutes at 180 degrees Celsius. The reaction yielded a first intermediate polymer having a relative Mw=29,250. The amount of additional bisphenol A disodium salt needed to obtain the desired molecular weight was determined from the graph shown in the figure. The figure was generated from empirical data. The graph relates the relative Mw to the grams of bishpenol A salt per 1,000 grams of polymer so when calculating the estimated amount of additional bisphenol A salt a correction factor relating the scale of the reaction to the scale of the graph must be used. The amount of bisphenol A salt estimated to be needed is equal to {grams bisphenol A salt/1,000 grams polymer for the target Mw - grams bisphenol A salt/1,000 grams polymer for the polymer at it's present state} X {226,796/1,000}.

| Polymer | Total bisphenol A salt added based on graph (per 1000 grams of polymer) | Total bisphenol A salt estimated to be needed to obtain desired molecular weight from first intermediate polymer based on graph | Bisphenol A salt added to previous intermediate polymer | Target MW | Mw obtained |
|---|---|---|---|---|---|
| First intermediate | 450.9 | — | — | 29,000 | 29,250 |
| Second intermediate | 463.5074 | 12.30938 | 6.175 | 42,000 | 42,300 |
| Third intermediate | 467.7938 | 16.49457 | 2.0995 | 46,000 | 46,200 |
| Fourth intermediate | 468.5502 | 17.23313 | 0.3705 | 48,000 | 47,700 |
| Final polymer | 469.0545 | 17.72551 | 0.247 | 49,000 | 48,600 |

As can be seen from the foregoing example, a polymer with a molecular weight very close to the target molecular weight may be obtained by estimating the amount of additional bisphenol A required based on historical data.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the invention scope thereof. It is, therefore intended that the invention not be limited to the particular embodiment disclosed as the best mode contemplated for carrying out this invention, but that the invention will include all embodiments falling within the scope of appended claims.

What is claimed is:

1. A method of making a polyether polymer comprising reacting a salt of a dihydroxy-substituted aromatic hydrocarbon with a substituted aromatic compound of formula (I)

$$Z(A^1-X^1)_2 \qquad (I)$$

in the presence of a catalyst to form an intermediate polymer having endgroups, wherein the molar ratio of the salt of a dihydroxy-substituted aromatic hydrocarbon to the substituted aromatic compound is less than 1, Z is an activating radical, $A^1$ is an aromatic radical and $X^1$ is fluoro, chloro, bromo or nitro;

determining the gram moles of endgroups per gram of polymer present on the intermediate polymer;

reacting the intermediate polymer with an additional amount of the salt of a dihydroxy-substituted aromatic hydrocarbon to form a final polymer having endgroups and a predetermined molecular weight wherein the additional amount of the salt of a dihydroxy-substituted aromatic hydrocarbon equals grams of final polymer X (gram moles of end groups per gram of polymer for the intermediate polymer - gram moles of end groups per gram of polymer for the final polymer)/2.

2. The method of claim 1 wherein the dihydroxy-substituted aromatic hydrocarbon has the formula

HO—$A^2$—OH    (II)

wherein $A^2$ is a divalent aromatic hydrocarbon radical.

3. The method of claim 2 wherein $A^2$ has the formula

—$A^3$—Y—$A^4$—    (III)

wherein each of $A^3$ and $A^4$ may be a monocyclic divalent aromatic hydrocarbon radical and Y comprises methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene.

4. The method of claim 1, wherein the the dihydroxy-substituted aromatic hydrocarbon is bisphenol A.

5. The method of claim 1, wherein the substituted aromatic compound comprises bis(arylene)sulfone, bis(arylene)ketone, tris(arylene)bis(sulfone), tris(arylene)bis(ketone), bis(arylene)benzo-1,2-diazine, bis(arylene)azoxy radical or a bis(ether imide) radical having the formula

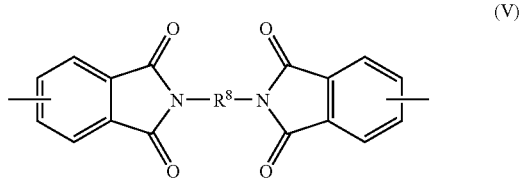

(V)

wherein $R^8$ is a substituted or unsubstituted $C_{6-20}$ divalent aromatic hydrocarbon radical, or a $C_{2-22}$ alkylene or cycloalkylene radical.

6. The method of claim 1, wherein the catalyst is a guanidinium salt.

7. The method of claim 1, wherein the intermediate polymer has a weight average molecular weight of about 10,000 to about 40,000.

8. The method of claim 1 wherein the grams moles of end groups per gram of polymer is determined using the equation: absolute number average molecular weight equals 2×(1-weight fraction of cyclics)/gram moles of endgroups per gram of polymer.

9. The method of claim 8 wherein the absolute number average molecular weight is measured by gel permeation chromatography.

10. The method of claim 8 wherein the weight fraction of cyclics is measured by gel permeation chromatography.

11. The method of claim 1 further comprising monitoring the reaction progress with an in-situ viscosity meter.

12. The method of claim 1 wherein the final polymer has a molecular weight of about 42,000 to about 49,000.

13. The method of claim 1 wherein the final polymer has a molecular weight of about 49,000 to about 60,000.

14. A method of making a polyether polymer comprising reacting a salt of a dihydroxy-substituted aromatic hydrocarbon with a substituted aromatic compound of formula (I)

$Z(A^1—X^1)_2$    (I)

in the presence of a catalyst to form an intermediate polymer, wherein the molar ratio of the salt of a dihydroxy-substituted aromatic hydrocarbon to the substituted aromatic compound is less than 1, Z is an activating radical, $A^1$ is an aromatic radical and $X^1$ is fluoro, chloro, bromo or nitro;

determining the molecular weight of the intermediate polymer;

calculating the amount of the salt of a dihydroxy-substituted aromatic hydrocarbon used to form the intermediate polymer based on molecular weight achieved and an historical trend of molecular weight versus amount of salt used;

determining an additional amount of a salt of a dihydroxy-substituted aromatic hydrocarbon to obtain a final polymer having a predetermined weight from the intermediate polymer wherein the additional amount of equals (amount of salt of dihydroxy-substituted aromatic hydrocarbon needed per amount of final polymer - amount of the salt of a dihydroxy-substituted aromatic hydrocarbon used to form the intermediate polymer per amount of intermediate polymer) X amount of final polymer;

reacting the intermediate polymer with the additional amount of the salt of a dihydroxy-substituted aromatic hydrocarbon to form the final polymer.

15. The method of claim 14 wherein the dihydroxy-substituted aromatic hydrocarbon has the formula

HO—$A^2$—OH    (II)

wherein $A^2$ is a divalent aromatic hydrocarbon radical.

16. The method of claim 15 wherein $A^2$ has the formula

—$A^3$—Y—$A^4$—    (III)

wherein each of $A^3$ and $A^4$ may be a monocyclic divalent aromatic hydrocarbon radical and Y comprises methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene.

17. The method of claim 14, wherein the the dihydroxy-substituted aromatic hydrocarbon is bisphenol A.

18. The method of claim 14, wherein the substituted aromatic compound comprises bis(arylene)sulfone, bis(arylene)ketone, tris(arylene)bis(sulfone), tris(arylene)bis(ketone), bis(arylene)benzo-1,2-diazine, bis(arylene)azoxy radical or a bis(ether imide) radical having the formula

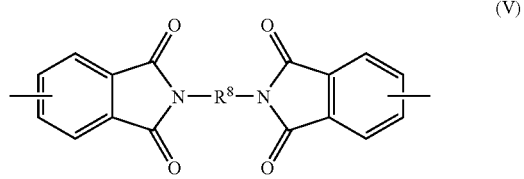

(V)

wherein $R^8$ is a substituted or unsubstituted $C_{6-20}$ divalent aromatic hydrocarbon radical, or a $C_{2-22}$ alkylene or cycloalkylene radical.

19. The method of claim 14, wherein the catalyst is a guanidinium salt.

20. The method of claim 14, wherein the intermediate polymer has a weight average molecular weight of about 10,000 to about 40,000.

21. The method of claim 14 further comprising monitoring the reaction progress with an in-situ viscosity meter.

22. The method of claim 14 wherein the final polymer has a molecular weight of about 42,000 to about 49,000.

23. The method of claim 14 wherein the final polymer has a molecular weight of about 49,000 to about 60,000.

* * * * *